United States Patent [19]
Mazdiyasni et al.

[11] 3,959,446
[45] May 25, 1976

[54] SYNTHESIS OF HIGH PURITY, ALPHA PHASE SILICON NITRIDE POWDER

[75] Inventors: Khodabakhsh S. Mazdiyasni, Xenia; Charles M. Cooke, Dayton, both of Ohio

[73] Assignee: The United States of America as represented by the Secretary of the Air Force, Washington, D.C.

[22] Filed: Mar. 1, 1974

[21] Appl. No.: 447,424

[52] U.S. Cl. .............................. 423/344; 423/413; 423/463
[51] Int. Cl.² ........................................ C01B 33/06
[58] Field of Search ............ 423/344, 413, 463, 324

[56] References Cited
OTHER PUBLICATIONS

Billy, M., "Préparation et Définition du Nitruve de Silicium;" *Annales de Chimie* Sér. 13, T4 pp. 818–819, 844–845, 850 (1959).
Lengfeld, F.; "The Action of Ammonia and Amines on Chlorides of Silicon," *American Chemical Journal*, pp. 531–537 Vol. 21, (1899).
Lengfeld, F., *The Journal of The American Chemical Society*, Vol. 21, p. 107 (1899).
Glemser, et al., *Zeit. Anorganic Chem.*, Vol. 298, pp. 134–141 (1959).

*Primary Examiner*—L. Dewayne Rutledge
*Assistant Examiner*—Michael L. Lewis
*Attorney, Agent, or Firm*—Joseph E. Rusz; Cedric H. Kuhn

[57] ABSTRACT

A method is provided for preparing alpha silicon nitride powder in which very high purity, liquid silicon tetrachloride is reacted with an excess of ammonia gas in dry deoxygenated benzene or normal hexane at about 0°C, yielding a precipitate of silicon diimide and ammonium chloride. After removal of the benzene or n-hexane from the precipitate, the mixture of silicon diimide and ammonium chloride powder is heated under a vacuum from room temperature to a temperature in the range of 1200° to 1350°C and maintained at the latter temperature for a period of about 2 to 8 hours. The product obtained is a high purity, submicron, alpha phase silicon nitride powder which is eminently suitable for the fabrication of dense, high strength, creep resistant and thermal shock resistant bodies for use in high performance gas turbine engines and in radome applications.

8 Claims, 1 Drawing Figure

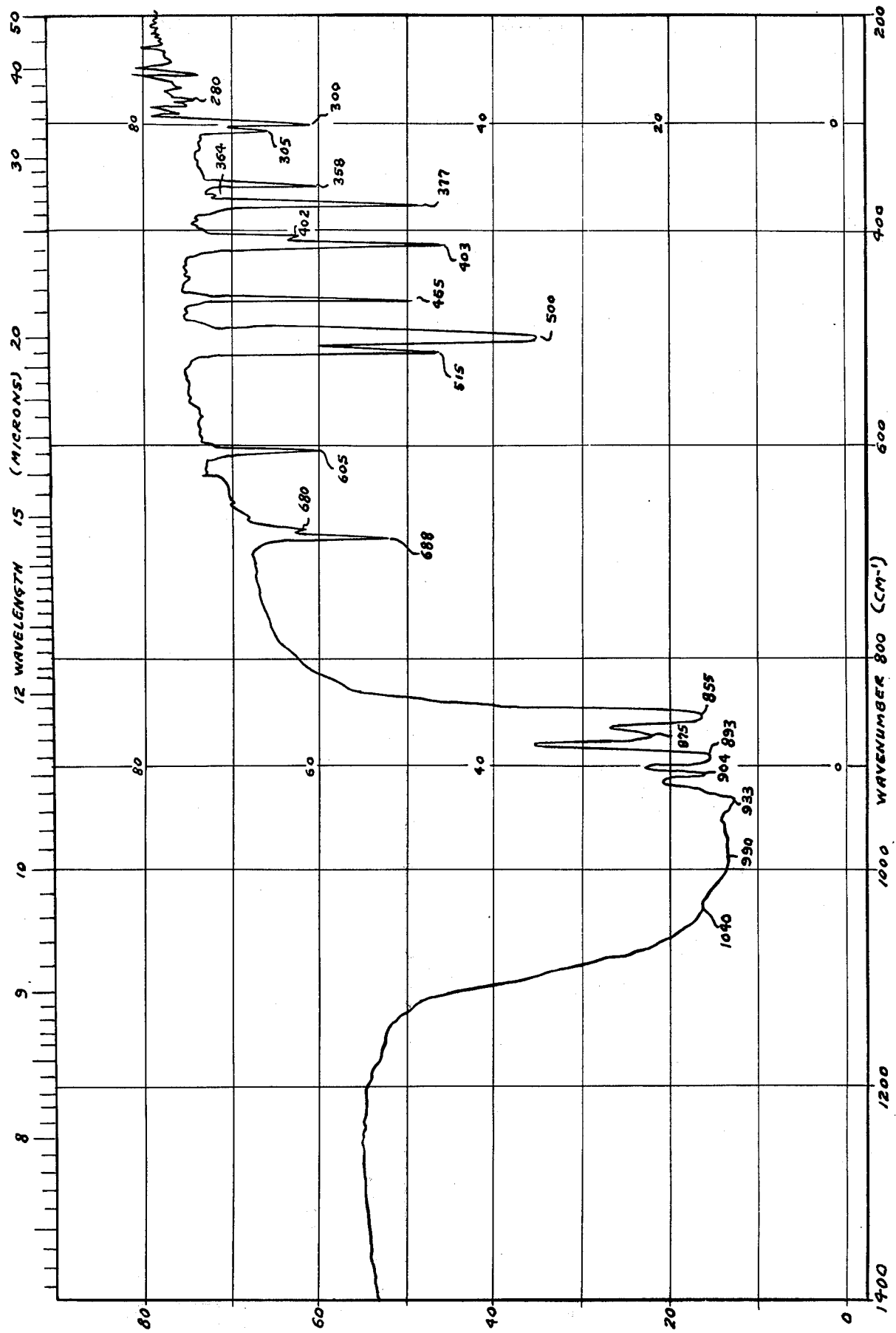

SYNTHESIS OF HIGH PURITY, ALPHA PHASE SILICON NITRIDE POWDER

RIGHTS OF THE GOVERNMENT

The invention described herein may be manufactured and used by or for the Government of the United States for all governmental purposes without the payment of any royalty.

FIELD OF THE INVENTION

This invention relates to a method for synthesizing high purity, submicron, alpha phase silicon nitride powder. In one aspect it relates to a method for preparing alpha silicon nitride powder which is particularly suitable for use in fabricating structural components by hot pressing.

BACKGROUND OF THE INVENTION

A great deal of research has been and is being conducted on the use of ceramics in the fabrication of structural components which must posess good mechanical properties at high temperatures. Of particular interest is silicon nitride because it exhibits high strength at elevated temperatures and excellent thermal shock, creep, and oxidation resistance in hostile atmospheres.

In fabricating structural components from silicon nitride, the usual procedure is to hot press or pressure sinter the silicon nitride, which is in finely divided form, in admixture with a sintering aid, such as magnesium oxide or alumina. In order to obtain a structural component having optimum physical properties, it is necessary that the silicon nitride be of very high purity and in finely divided form, i.e., of submicron size. Furthermore, alpha phase silicon nitride powder should be used as the starting material because higher strength and more uniform structures are obtained by hot pressing than when beta phase silicon nitride is present in any appreciable amount in the starting material.

In the past, a variety of procedures have been followed in synthesizing silicon nitride. These include the nitridation of silicon with ammonia and the reaction of silicon tetrachloride or tetrabromide with ammonia. In the latter method, silicon tetrachloride and ammonia are separately introduced into a furnace wherein the materials react at an elevated temperature. The silicon diimide that is formed decomposes, yielding silicon nitride which deposits on a substrate as a thin film. The former method involves charging ammonia to a furnace containing a mass of silicon and reacting the materials at an elevated temperature to form silicon nitride. The silicon nitride product is in the form of a spongelike material which prior to use is ball milled, employing iron or tungsten balls so as to provide silicon nitride powder. This method for preparing the powder is unsatisfactory in that the product is a mixed alpha and beta phase silicon nitride. Furthermore, the product is contaminated with excess silicon, boron, calcium, and transition elements as major impurities.

It is an object of this invention, therefore, to provide a method for preparing high purity, submicron, alpha phase silicon nitride powder.

Another object of the invention is to provide a silicon nitride powder which is particularly suitable for use in fabricating structural components.

Other objects and advantages of the invention will become apparent to those skilled in the art upon consideration of the accompanying disclosure and the drawing which shows the infrared spectrum of silicon nitride powder prepared by the method of this invention.

SUMMARY OF THE INVENTION

The present invention resides in an improved method for preparing very high purity, fine particle size alpha silicon nitride by ammonalysis of silicon tetrachloride. It has been discovered that such a product can be obtained if liquid silicon tetrachloride is reacted with an excess of anhydrous, gaseous ammonia in dry deoxygenated benzene or n-hexane under conditions such that a precipitate of silicon diimide and ammonium chloride is formed. After removal of the n-hexane, the dry silicon diimide-ammonium chloride mixture, which is in finely divided form, is decomposed under conditions such that the aforementioned single phase silicon nitride product is produced.

As mentioned above, the initial step of the method of this invention involves the reaction of liquid silicon tetrachloride and gaseous ammonia in dry benzene or n-hexane. The silicon tetrachloride utilized is of high purity, e.g., a purity of 99.95 percent and higher. While stoichiometric amounts of the reactants can be used, it is generally preferred to use an excess of the ammonia, e.g., 0.10 to 0.50 mol in excess of that required. The reaction is conducted at a low temperature, e.g., in the range of about −10°C to 5°C for a period of time sufficient for the reaction to go to completion. A period in the range of about 0.5 to 2 hours is usually sufficient for carrying out the reaction. The reaction that occurs is shown by the following equation:

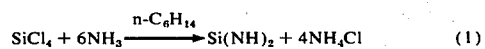

$$SiCl_4 + 6NH_3 \xrightarrow{n\text{-}C_6H_{14}} Si(NH)_2 + 4NH_4Cl \qquad (1)$$

As a result of the reaction, a white precipitate forms in the n-hexane reaction medium. The white precipitate is then recovered and dried, thereby obtaining a silicon diimide-ammonium chloride mixture which is in finely divided form. It is usually preferred to remove the n-hexane from the reaction mixture by vacuum distillation.

The silicon diimide-ammonium chloride mixture is next heated under a vacuum or a blanket of an inert gas in a container which is non-reactive with the reactants. A container made of quartz, graphite or recrystallized alumina has been found to be suitable. A vacuum in the range of $10^{-6}$ to $10^{-3}$ torr can be used. Examples of suitable inert gases include dry, prepurified helium, argon and nitrogen. After heating the mixture from room temperature to a temperature in the range of about 1200° to 1350°C, it is maintained at that temperature for a period of about 2 to 8 hours. The lower the temperature the longer the mixture is held at that temperature so as to obtain alpha silicon nitride. The time required to raise the mixture to a temperature in aforementioned range cannot be defined with any degree of accuracy. The actual time will depend on the type and size of the container as well as the amount of the mixture. It is usually preferred to raise the temperature as rapidly as possible, and this can generally be accomplished in from about 0.25 to 1.5 hours. The result of the reactions that occur during the heating step can be represented by the following equation:

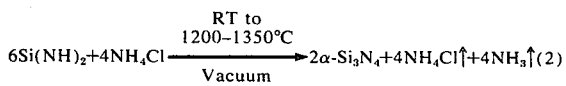

While equation (2) shows the result of the reactions that occur, in actuality the reactions that take place are complicated and not completely understood. It is believed that upon heating the mixture, initially the ammonium chloride is sublimed as shown by the following equation:

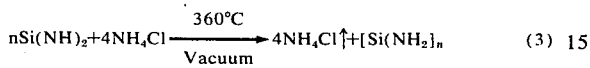

The $Si(NH)_2$ polymerizes readily and spontaneously with increasing temperature, its pyrolysis resulting in two intermediate species before it yields $\alpha\text{-}Si_3N_4$ as shown by the following equation:

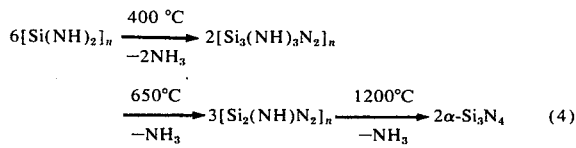

According to equation 3, sublimation of the ammonium chloride is complete at 360°C. Also, as shown by equation 4, two mols of ammonia are lost by the time the mixture reaches 400°C while one mol is lost at each of 650° and 1200°C. However, it should be understood that the temperatures shown are illustrative only and are not intended to indicate accurately the temperatures at which sublimation and ammonia removal occur. For example, sublimation of the ammonium chloride may continue to take place at a temperature considerably greater than 360°C. In any event, the product obtained by proceeding in accordance with the indicated conditions is alpha silicon nitride.

Upon completion of the heating step, the alpha silicon nitride while still under a vacuum or a blanket of an inert gas is allowed to cool to room temperature. The alpha silicon nitride which is then removed from the container is in the form of submicron particulates having a particle size of 100 to 300 angstroms. When mixed with a sintering aid, such a finely divided magnesium nitride or oxide, the alpha silicon nitride powder can be consolidated by hot pressing to near theoretical density in providing structural component with improved high temperature and electrical properties.

A more complete understanding of the invention can be obtained by referring to the following illustrative example which is not intended, however to be unduly limitative of the invention.

EXAMPLE

A run was conducted in which alpha silicon nitride was prepared in accordance with the method of this invention. Initially, liquid silicon tetrachloride of 99.95 percent purity was added to a closed reaction vessel containing n-hexane. Anhydrous ammonia gas was then bubbled into the liquid mixture contained in the vessel. The contents of the vessel were maintained at about 0°C by positioning the vessel in an ice bath. The amount of ammonia added was such that the mol ratio of ammonia to silicon tetrachloride was about 6.1 to 1. As the silicon tetrachloride and ammonia reacted with one another, a white precipitate formed in the reaction medium. At the end of about 1.25 hours, the reaction had gone to completion. The white precipitate was then isolated by distillation of the normal hexane under reduced pressure at 25°C. The product obtained was a dry mixture of silicon diimide and ammonium chloride that was in finely divided form.

The mixture of silicon diimide and ammonium chloride was placed in an alumina container which was then positioned in a vacuum furnace. The container and its contents were heated under a vacuum of $10^{-5}$ torr from room temperature to about 1300°C in a period of about 30 minutes. The temperature was maintained at 1300°C for a period of 2 hours after which the container was allowed to cool to room temperature. The silicon nitride product obtained, which was in the form of a powder, was recovered from the container and stored in a dry box free of oxygen.

The silicon nitride powder was examined by electron microscopy. In making this examination, a sample of the powder was dispersed ultrasonically in a solution of absolute ethyl alcohol. A small amount of the dispersion was then placed in a Freon nebulizer and sprayed onto a carbon substrate on a Cu-mesh screen. The electron micrograph showed twisted fiber bundles and/or needlelike crystallites of the alpha phase. The crystallites had a particle size ranging from about 100 to 300 angstroms.

Spectrographic analyses for impurities in the silicon nitride powder showed no measurable pickup of any major impurity. The total amount of impurities detected was less than 300 ppm; the major contaminants were about 100 ppm each of iron and nickel.

Wet chemical analysis with an accuracy of $\pm 0.1\%$ was performed for silicon and nitrogen on the silicon nitride powder. The results indicated a 60/40 ratio which is within experimental error of the theoretical value (60.08/39.92 Si:N).

The infrared (ir) spectrum of the silicon nitride powder is shown in the drawing. In carrying out the ir study, a 1-mg sample of the powder was dispersed in 400 mg of anhydrous spectrographic grade CsI powder and pressed into a disk. An ir grating spectrometer was used for transmission spectra over the 4000 to 200 cm$^{-1}$ region where its spectral slit width seldom exceeded 2 cm$^{-1}$. The fundamental ir absorption bands resulting from the Si-N bond are found at 850 to 1000 cm$^{-1}$ with maxima 930cm$^{-1}$ and between 300 and 600 cm$^{-1}$. As seen from the spectrum shown in the drawing, the ir absorption bands in these regions compare favorably with absorption frequencies of Si-N compounds. Also, it is seen that there are no major bands at 575, 440, and 375 CM$^{-1}$ which bands are characteristic absorption frequencies of beta silicon nitride. Thus, the intensity and the position of the ir band in the ir spectrum indicates that the product is very high purity single phase submicron size alpha silicon nitride. The identification of the alpha phase silicon nitride by ir study was in excellent agreement with that of electron microscopy and X-ray analyses.

As will be evident to those skilled in the art, modifications of the invention can be made in view of the foregoing disclosure that fall within the spirit and scope of the invention.

We claim:

1. A method for preparing high purity, alpha silicon nitride powder which comprises the steps of:
   a. reacting high purity, liquid silicon tetrachloride with anhydrous ammonia gas in dry deoxygenated benzene or dry normal hexane at a temperature in the range of about −10°C to 5°C, the mole ratio of silicon tetrachloride to ammonia gas being about 1 to 6, thereby forming a precipitate of a mixture of silicon diimide and ammonium chloride;
   b. removing deoxygenated benzene or normal hexane from the mixture;
   c. recovering the resulting dried mixture of silicon diimide and ammonium chloride, the mixture being in finely divided form;
   d. heating the mixture of silicon diimide and ammonium chloride under a vacuum or in an inert atmosphere to a temperature in the range of about 1200° to 1350°C; and
   e. maintaining the mixture at a temperature in said range for a period of about 2 to 8 hours, thereby converting the mixture to a product consisting of alpha silicon nitride.

2. The method according to claim 1 in which a molar excess of ammonia of about 0.10 to 0.50 mol is reacted with the silicon tetrachloride.

3. The method according to claim 1 in which the alpha silicon nitride at the end of the heating period is allowed to cool to room temperature while still under a vacuum or under a blanket of an inert gas; and high purity alpha silicon nitride powder is recovered as the product of the method.

4. The method according to claim 3 in which the mixture of silicon diimide and ammonium chloride is heated under a vacuum and the alpha silicon nitride is allowed to cool while still under a vacuum.

5. The method according to claim 3 in which the mixture of silicon diimide and ammonium chloride is heated in an inert gas atmosphere and the alpha silicon nitride is allowed to cool while still in an inert gas atmosphere.

6. The method according to claim 5 in which the inert gas is helium, argon or nitrogen.

7. The method according to claim 3 in which the deoxygenated benzene or normal hexane is removed by vacuum distillation.

8. The method according to claim 7 in which the liquid silicon tetrachloride has a purity of at least 99.95 percent and the silicon nitride powder contains less than 300 ppm of impurities.

* * * * *